United States Patent
Eguchi et al.

(10) Patent No.: US 7,664,952 B2
(45) Date of Patent: Feb. 16, 2010

(54) SERVICE VERIFYING SYSTEM, AUTHENTICATION REQUESTING TERMINAL, SERVICE UTILIZING TERMINAL, AND SERVICE PROVIDING METHOD

(75) Inventors: Hisatoshi Eguchi, Yokosuka (JP); Fumiaki Miura, Yokasuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1092 days.

(21) Appl. No.: 10/685,399

(22) Filed: Oct. 16, 2003

(65) Prior Publication Data
US 2005/0154914 A1   Jul. 14, 2005

(30) Foreign Application Priority Data
Oct. 16, 2002   (JP) ............................ P2002-302102

(51) Int. Cl.
*H04L 9/32* (2006.01)

(52) U.S. Cl. ...................... 713/168; 713/155; 380/270; 726/4; 726/16; 726/28

(58) Field of Classification Search .................. 380/270; 713/155, 168; 726/4, 16, 28
See application file for complete search history.

(56) References Cited

U.S. PATENT DOCUMENTS

| | | | |
|---|---|---|---|
| 5,687,235 A | 11/1997 | Perlman et al. | 380/25 |
| 6,085,171 A * | 7/2000 | Leonard | 705/26 |
| 6,587,836 B1 * | 7/2003 | Ahlberg et al. | 705/26 |

2004/0261116 A1   12/2004  Mckeown et al.

FOREIGN PATENT DOCUMENTS

| | | | |
|---|---|---|---|
| EP | 1 054 543 A2 | 11/2000 | |
| EP | 1 238 690 A2 | 9/2002 | |
| JP | 2002-269352 | 9/2002 | |

(Continued)

OTHER PUBLICATIONS

Bruce Schneier, "Applied Chryptography", John Wiley & Sons, Inc., 1996, pp. 52-56.

(Continued)

*Primary Examiner*—Emmanuel L Moise
*Assistant Examiner*—Paul Callahan
(74) *Attorney, Agent, or Firm*—Oblon, Spivak, McClelland, Maier & Neustadt, L.L.P.

(57) ABSTRACT

An object is to provide a service providing method capable of curbing rise of cost. A service providing method according to the present invention is one for providing services A and B, which authenticates a user of an authentication requesting terminal in order to make service A available to the user and which determines whether service B is available to the user, in a state in which the user is authenticated about service A. When service B is determined to be available, a permission message is stored and a permission response based on the permission message for utilization of service B is transmitted to the authentication requesting terminal. Then the permission message on which a utilization request message from a service utilizing terminal is based, is verified, and, if it is in an available status, the service utilizing terminal is permitted to utilize service B. The use of the authentication result on service A obviates a need for provision of new authentication means for service B, so as to lead to reduction of cost.

16 Claims, 9 Drawing Sheets

FOREIGN PATENT DOCUMENTS

WO      WO 01/43390 A2      6/2001
WO      WO 01/91479 A2      11/2001

OTHER PUBLICATIONS

"NTT DoCoMo Technical Journal", The Telecomunications Association, vol. 3, No. 4, Jan. 2002, pp. 34-43 (with English translation pp. 23-33).

Keiji Tachikawa, "W-CDMA Mobile Communications System", John Wiley and Sons, Ltd. 2002, pp. 345-356.

Stelvio Cimato, "Design of an Authentication Protocol for Gsm Javacards", Information Security and Criptology-ICISC 2001. 4th International Conference. Proceedings (Lecture Notes in Computer Science vol. 2288) Springer-Verlag Berlin, Germany, XP-002526434, Dec. 6 and 7, 2001, pp. 355-368.

W Stallings, "Autentication Applications", Cryptography and Network Security, Cryptography and Network Security: Principles and Pratice, XP-002161792, Jan. 1, 1998, pp. 323-340.

P V McMahon, "Sesame V2 Public Key and Authorisation Extensions to Kerberos", Network and Distributed System Security, IEEE Comput. Soc.,XP-010134534, Feb. 16, 1995, pp. 114-131.

Eric Freudenthal, et al., "dRBAC: Distributed Role-based Access Control for Dynamic Coalition Environments", Proceedings of the 22nd International Conference on Distributed Computing Systems. ICDCS Vienna, Austria; International Confernce on Distributed Computing Systems, Los Alamitos, CA. IEEE Comp. Soc. US, Conf. 22,, XP-010595553, Jul. 2, 2002, pp. 372-381.

* cited by examiner

Fig.2

| ID | PASSWORD | SHARED SECRET | PRIVATE KEY | PUBLIC KEY | AUTHENTICATION METHOD |
|---|---|---|---|---|---|
| U100 | — | — | — | — | — |
| U101 | — | — | — | — | — |
| U102 | — | — | — | — | — |
| ... | ... | ... | ... | ... | ... |

11

SERVICE VERIFYING SYSTEM, AUTHENTICATION REQUESTING TERMINAL, SERVICE UTILIZING TERMINAL, AND SERVICE PROVIDING METHOD

BACKGROUND OF THE INVENTION

1. Field of the Invention

The present invention relates to a service verifying system for providing a plurality of services, an authentication requesting terminal to be authenticated by the service verifying system to utilize a service provided by the service verifying system, a service utilizing terminal for utilizing another service provided by the service verifying system on the basis of the result of the authentication of the authentication requesting terminal, and a service providing method.

2. Related Background Art

There are conventionally known systems for providing services for cell phones and PHSs in mobile communications and others. Each user needs to have a contract with a company providing services in order to utilize such services. Many of companies providing services provide services for only users having a contract for utilization of services (qualified users), but do not provide services for users without a contract. For this reason, it is necessary to establish a scheme for letting only the qualified users utilize the services, and schemes of this type have already been substantialized heretofore.

The existing service verifying systems for providing services employ a control system of managing customer information of qualified users, authenticating whether a user requesting utilization of a service is a qualified user, using the customer information, and permitting the utilization of the service only when the result of the authentication is affirmative. It is necessary to build up such a system, in order to let only the qualified users utilize the services.

[Nonpatent Document 1] Bruce Schneier, "APPLIED CRYPTOGRAPHY," John Wiley & Sons, Inc., 1996, pp. 52-56

[Nonpatent Document 2] "NTT Docomo Technical Journal Vol. 9, No. 4," The Telecommunications Association, January 2002, pp. 34-43

[Nonpatent Document 3] Keiji Tachikawa, "W-CDMA MOBILE COMMUNICATIONS SYSTEM," John Wiley & Sons, Ltd, 2002, pp. 345-356

SUMMARY OF THE INVENTION

In the foregoing system, however, when a company providing a certain service starts providing another service, it must establish a system for permitting only qualified users of contractants to access, from the beginning, which requires a lot of cost and design time. It is also necessary to perform the maintenance and management of the system in order to prevent suspension of the service due to failure or the like. As the scale of the system increases, the management cost tends to increase. In this respect there was room for further improvement in the foregoing system.

An object of the present invention is, therefore, to solve the above problem and thereby provide a service verifying system, an authentication requesting terminal, a service utilizing terminal, a service verification network system, and a service providing method capable of curbing rise of cost.

A service verifying system according to the present invention is a service verifying system for providing a plurality of services, comprising: authentication information storing means for storing authentication information to authenticate a user permitted to utilize a first service; available service information storing means for storing information about services available to respective users; permission message information storing means for, on the occasion of permitting utilization of a second service different from the first service, storing message information based on a permission message to distinguish a permission of the utilization thereof; first message receiving means for receiving a message according to an authentication method of a first service; authenticating means for verifying the message received by the first message receiving means, based on the authentication information in the authentication information storing means, to identify a user of the first service and authenticate whether the first service is available to the user; other service utilization request receiving means for receiving a utilization request for utilization of the second service, which is transmitted from the user authenticated to utilize the first service by the authenticating means; other service availability determining means for, on the occasion of receiving the utilization request by the other service utilization request receiving means, determining whether the second service is available to the user, based on the information in the available service information storing means; permission message information updating means for, when the other service availability determining means determines that the second service is available, enabling the message information based on a permission message in the permission message information storing means; permission response transmitting means for, when the other service availability determining means determines that the second service is available, transmitting a permission response based on the permission message; second message receiving means for receiving a message based on the permission response; service provision propriety determining means for verifying determines whether the second service is providable, based on the message received by the second message receiving means and the message information in the permission message information storing means; and permission message status releasing means for, when the service provision propriety determining means determines that the second service is providable, permitting utilization of the second service and disabling the message information in the permission message information storing means.

The above service verifying system may be configured as a system for providing a plurality of services, comprising: authentication information storing means for storing authentication information to authenticate a user permitted to utilize a first service; available service information storing means for storing information about services available to respective users; permission message information storing means for, on the occasion of permitting utilization of a second service different from the first service, storing message information for restoring a permission message to distinguish a permission of the utilization thereof; permission message status storing means for storing message status information indicating whether the message information is available; first message receiving means for receiving a message according to an authentication method of a first terminal; authenticating means for verifying the message received by the first message receiving means, based on the authentication information stored in the authentication information storing means, to identify a user of the first terminal and authenticate whether the first service is available to the user; other service utilization request receiving means for receiving a utilization request for utilization of the second service, which is transmitted from the first terminal authenticated to utilize the first service by the authenticating means; other service availability determining means for, on the occasion of receiving the utilization request by the other service utilization request receiving means, determining whether the second service is available to the user, based on the information in the available service information storing means; permission message status updating means for, when the other service availability determining means determines that the second service is available, storing the message information for restoring a permission message to distinguish a permission of utilization of the second service in the permission message information storing means and storing the message status information indicating a status that the message information is available, in the permission message status storing means; permission response transmitting means for, when the other service availability determining means determines that the second service is available, transmitting a permission response based on the permission message to the first terminal; second message receiving means for receiving a message based on the permission response, which is transmitted from a second terminal; service provision propriety determining means for verifying whether the message received by the second message receiving means is available, based on the message status information stored in the permission message status storing means, and whether consistency of the message is ensured, based on the message information stored in the permission message information storing means, to determine whether the second service is providable for the second terminal; and permission message status releasing means for, when the service provision propriety determining means determines that the second service is providable, permitting utilization of the second service and changing the message status information in the permission message status storing means into an unavailable status.

As described above, the service verifying system according to the present invention comprises the authenticating means and, when receiving from the first terminal a message according to the authentication method of the terminal, the authenticating means identifies the user of the first terminal and authenticates whether the first service is available to the first terminal, on the basis of the message. When the other service utilization request receiving means receives a utilization request for utilization of the second service transmitted from the first terminal in a state in which the user of the first terminal is authenticated as a qualified user by the authentication, the other service availability determining means determines whether the second service is available to the user, based on the available service information storing means. In this configuration, since the availability of the second service is determined in the state in which the user of the first terminal is authenticated as a qualified user, the authentication of the second service can be omitted by utilizing the result of the authentication of the first service. When the result of the determination is that the second service is available, the message information for restoring a permission message to distinguish a permission is stored into the permission message information storing means, the message status information indicating the available status of the permission message is stored, and a permission response based on the permission message is transmitted to the first terminal. When a message based on the permission message is sent thereafter from the second terminal, the message is received by the second message receiving means; it is verified on the basis of the permission message status storing means whether the permission message on which the message is based is in the available status; it is further verified whether the permission message is correctly configured, based on the message information stored in the permission message information storing means; and the second service is provided for the second terminal when the permission message is in the available status and when the permission message itself is correctly configured. As just described, when the service verifying system determines that the second service is available, it transmits the permission response based on the permission message to the first terminal and the second terminal transmits the message based on the permission message received by the first terminal, to the service verifying system; whereby the service verifying system can determine whether the service is providable for the second terminal, by simply verifying whether the permission message on which the message transmitted from the second terminal is based is in the available state, without need for identifying the user of the second terminal. The use of the authentication result of the first service in the utilization of the second service, as described above, obviates the need for building up some new authenticating means in provision of the second service from the start, which can curtail the cost and design time. A method of informing the second terminal of the permission response received by the first terminal can be any method. For example, it may be transmitted from the first terminal to the second terminal by near field wireless communication, or a user looking at the first terminal may manually enter necessary information into the second terminal. The first terminal and the second terminal may be configured as a single terminal, and this configuration is preferable in that the permission response can be transmitted inside the terminal.

The above service verifying system may be configured as a system further comprising additional information storing means for storing additional information for verifying a message further based on additional information used for utilization of the second service; wherein the second message receiving means receives the message further based on the additional information; and wherein the service provision propriety determining means determines whether the second service is providable, further based on the additional information in the additional information storing means, to verifying whether the second service is providable for the second terminal.

The further use of the additional information as in the above configuration enhances the security and permits the second service to be provided more safely. Conceivable examples of the additional information include identification information to distinguish the second terminal, authentication information to authenticate the second terminal, and so on.

The above service verifying system may be configured as a system further comprising: area information storing means for storing available area information about an area where the second service is available; and area information updating means for, on the occasion of receiving the utilization request by the other service utilization request receiving means, deriving the available area information from information about a staying area of the first terminal and storing the available area information in the area information storing means; wherein the service provision propriety determining means further verifies whether a staying area of the second terminal is within an area where the service is available, based on the available area information in the area information storing means, and determines that the second service is providable, when a staying area of the second terminal is within an area where the service is available.

When the system is constructed by adopting this configuration wherein upon reception of the utilization request for utilization of the second service the area information about the available area of the second service is derived from the staying area of the first terminal and stored as available area information in the area information storing means and wherein upon reception of the message from the second terminal it is determined on the basis of the area information storing means whether the staying area of the second terminal is within the available area, to determine the propriety of provision of the second service, the second terminal is allowed to utilize the second service in the permitted area only, whereby the security is enhanced while reducing opportunities of misuse.

The above service verifying system may be configured as a system wherein when the permission response is enable, based on the message information in the available message information storing means, and when the staying area of the first terminal moves off the available area proved by the available area information storing means, the area information updating means stores the available area information derived from information about the staying area after the movement of the first terminal, into the area information storing means.

When the staying area of the first terminal authenticated moves, the area information updating means updates the available area information stored in the area information storing means, as described above, whereby it also becomes feasible for the system to adapt to cases where the user moves.

The above service verifying system may be configured as a system wherein when the permission response is enable, based on the message information in the available message information storing means, when the staying area of the first terminal moves off the available area proved by the available area information storing means, and when the other service utilization request receiving means receives the utilization request, the area information updating means stores the available area information derived from information about the staying area after the movement of the first terminal, in the area information storing means.

After movement of the staying area of the first terminal authenticated, the available area information is derived from the staying area of the first terminal at the time of receiving the other service utilization request by the other service utilization request receiving means, as described above, whereby it also becomes feasible for the system to adapt to cases where the user moves.

The above service verifying system may be configured as a system further comprising: time information storing means for storing available time information about a time period in which the second service is available; and time information updating means for, on the occasion of receiving the utilization request by the other service utilization request receiving means, storing available time information into the time information storing means;

wherein the service provision propriety determining means further verifies whether a time when the second message receiving means receives the message is within the time period in which the service is available, based on the available time information stored in the time information storing means, and wherein when the time of reception of the message is within the time period in which the second service is available, the service provision propriety determining means determines that the second service is providable.

When the system is constructed by adopting this configuration wherein the time period in which the second service is available is stored as available time information in the time information storing means and wherein upon transmission of the message from the second terminal it is determined whether the reception time of the message is within the available time period of the second service, to determine the propriety of provision of the second service, the second terminal is allowed to utilize the second service within the permitted time period only, whereby the security can be enhanced while reducing opportunities of misuse. The available time period of the second service can be set, for example, by a method of setting a period of some minutes after transmission of the permission response to the first terminal, or by a method of setting the time period according to a type of the second service.

The above service verifying system may be configured as a system wherein the permission response transmitting means transmits the permission response further based on available area information derived from information about a staying area of the first terminal, and wherein the service provision propriety determining means further verifies whether a staying area of the second terminal is within an area where the service is available, based on the message received by the second message receiving means, and determines that the second service is providable, when a staying area of the second terminal is within an area where the service is available.

When the system is constructed by adopting this configuration wherein upon reception of the utilization request for utilization of the second service the area information about the available area of the second service is derived from the staying area of the first terminal, wherein the permission response further based on the available area information is transmitted to the first terminal, and wherein upon transmission of the message from the second terminal it is determined whether the second terminal is in the available area on which the message is based, to determine the propriety of provision of the second service, the second terminal is allowed to utilize the second service in the permitted area only, whereby the security can be enhanced, while reducing opportunities of misuse, and whereby the service verifying system can be constructed in the configuration without need for storing the information about the available area.

The above service verifying system may be configured as a system wherein the permission response transmitting means transmits the permission response further based on available time information, and wherein the service provision propriety determining means further verifies whether a time when the second message receiving means receives the message, is within the time period derived from the message received by the second message receiving means, and wherein when the time of reception of the message is within a time period in which the service is available, based on the message received by the second message receiving means, the service provision propriety determining means determines that the second service is providable.

When the system is constructed by adopting this configuration wherein the permission response further based on the available time information about the available time period of the second service is transmitted to the first terminal and wherein upon transmission of the message from the second terminal it is determined whether the reception time of the message is within the available time period on which the message is based, to determine the propriety of provision of the second service, the second terminal is allowed to utilize the second service in the permitted time period only, whereby the security can be enhanced, while reducing opportunities of misuse, and whereby the service verifying system can be constructed in the configuration without need for storing the information about the available time period.

An authentication requesting terminal according to the present invention is an authentication requesting terminal permitted to utilize a first service provided by a service verifying system and configured to execute authentication for utilization of the first service, the authentication requesting terminal comprising: authentication information storing means for storing authentication information for utilization of the first service; first message transmitting means for transmitting a message based on the authentication information in the authentication information storing means and according to an authentication method; other service utilization request transmitting means for transmitting a utilization request for utilization of a second service when the first service is available; and permission response receiving means for receiving a permission response based on a permission message.

When the authentication requesting terminal is configured, as described above, to transmit the message based on the authentication information for utilization of the first service to the service verifying system and transmit the utilization request for utilization of the second service in the state in which the user is authenticated as a qualified user by the service verifying system, the authentication can be omitted for the second service by making use of the authentication result of the first service. The authentication requesting terminal has the permission response receiving means to receive the permission response based on the permission message. If the second terminal (service utilizing apparatus) is informed of this permission response, the second terminal can transmit a message based on the permission response to the service verifying system, and the service verifying system can verify whether the permission message on which the message is based is in the available status, whereby the second terminal can utilize the second service, without need for conducting independent authentication thereof. The authentication requesting terminal itself may be provided with the function of the second terminal, and in this case, it is also feasible to enjoy the merit of capability of omitting the authentication on the occasion of utilization of the second service.

The above authentication requesting terminal may be configured as a terminal wherein the permission response receiving means receives a permission response further based on available area information of the second service.

The permission response receiving means receives the permission response further based on the available area information, and if a message based on this permission response is transmitted to the service verifying system, the service verifying system can determine whether the second terminal is in the available area on which the message is based. This limits the available area of the second service and the security can be enhanced, while reducing opportunities of misuse.

The above authentication requesting terminal may be configured as a terminal wherein the permission response receiving means receives a permission response further based on available time information of the second service.

The permission response receiving means receives the permission response further based on the available time information, and if a message based on this permission response is transmitted to the service verifying system, the service verifying system can determine whether the message reception time from the second terminal is within the available time period on which the message is based. This limits the available time period of the second service whereby the security is enhanced, while reducing opportunities of misuse.

A service utilizing terminal according to the present invention is a service utilizing terminal for, based on a response transmitted to the authentication requesting terminal for the second service, receiving provision of a second service, the service utilizing terminal comprising: second message transmitting means for transmitting a message for utilization of the second service, based on a permission response received by the authentication requesting terminal; wherein the message is based on a permission response received by the authentication requesting terminal from the service verifying system.

When the message based on the permission response received by the authentication requesting terminal is transmitted to the service verifying system, as described above, the service verifying system can determine whether the permission message on which the message transmitted is based is in the available status, whereby the service utilizing terminal can utilize the second service, without need for authentication of the user.

The above service utilizing terminal may be configured as a terminal further comprising additional information storing means for storing additional information used for utilization of the second service, wherein the message transmitted by the second message transmitting means is further based on the additional information in the additional information storing means.

The further use of the additional information in this way enhances the security whereby the second service can be provided more safely. Conceivable examples of the additional information include identification information to distinguish the service utilizing terminal, authentication information to authenticate the service utilizing terminal, and so on.

A service providing method according to the present invention is a service providing method for providing services in a service verification network system, the service verification network system comprising a service verifying system for providing a plurality of services, an authentication requesting terminal authenticated by the service verifying system to utilize a first service provided by the service verifying system, and a service utilizing terminal for utilizing a second service provided by the service verifying system, based on a response transmitted to the authentication requesting terminal for the second service, said service providing method comprising: a first message transmitting step wherein the authentication requesting terminal transmits a message based on authentication information to the service verifying system, according to an authentication method; an authenticating step wherein the message received in the first message transmitting step is verified based on authentication information previously stored in the service verifying system, to identify a user of the authentication requesting terminal and authenticate whether the first service is available to the user of the first service; an other service utilization request transmitting step wherein when the first service is available, the authentication requesting terminal transmits a utilization request for utilization of the second service to the service verifying system; an other service availability determining step wherein when the utilization request is received in the other service utilization request transmitting step, the service verifying system determines whether the second service is available to the user, based on an information about services available to respective users previously stored in the service verifying system; a permission message information updating step wherein when it is determined in the other service availability determining step that the second service is available, the service verifying system stores message information based on a permission message to distinguish a permission of utilization of the second service, into permission message information storing means; a permission response transmitting step wherein when it is determined in the other service availability determining step that the second service is available, the service verifying system transmits a permission response based on the permission message, to the authentication requesting terminal; a second message transmitting step wherein the service utilizing terminal transmits a message based on the permission response received by the authentication requesting terminal in the permission response transmitting step, to the service verifying system; a service provision propriety determining step wherein it is verified whether the second service is providable, based on the message received by the second message receiving step and the message information in the permission message information storing means; and a permission message status releasing step wherein when it is determined in the service provision propriety determining step that the second service is providable, utilization of the second service is permitted, and disabling the message information in the permission message information storing means.

The service providing method according to the present invention, as described above, comprises the authenticating step wherein the user of the authentication requesting terminal is identified by the message according to the authentication method of the authentication requesting terminal, which is transmitted from the authentication requesting terminal, and wherein it is authenticated whether the first service is available to the authentication requesting terminal. When the utilization request for utilization of the second service transmitted from the authentication requesting terminal is received thereafter in the other service utilization request transmitting step in the state in which the user of the authentication requesting terminal is authenticated as a qualified user in the authenticating step, whether the second service is available to the user is determined based on the available service information storing means in the other service availability determining step. In this configuration, where the availability of the second service is determined in the state in which the user of the authentication requesting terminal is authenticated as a qualified user, the authentication of the second service can be omitted by making use of the authentication result of the first service. When the result of the determination is that the second service is available, the message information for restoring the permission message to distinguish the permission of utilization is stored into the permission message information storing means, the message status information indicating that the permission message to distinguish the permission of utilization is in the available status is stored, and the permission response based on the permission message is transmitted to the authentication requesting terminal. When in the second message transmitting step the utilization request based on the permission response is transmitted thereafter from the service utilizing terminal, the utilization request is received, and whether the permission message on which the message is based is in the available status is verified based on the permission message status storing means. Furthermore, whether the permission message is correctly configured is verified based on the message information stored in the permission message information storing means, and the second service is provided for the service utilizing terminal when the permission message is in the available status and when the permission message itself is determined to be correctly configured. When the second service is determined to be available, the permission response based on the permission message is transmitted to the authentication requesting terminal and the service utilizing terminal transmits the message based on the permission response received by the authentication requesting terminal, to the service verifying system; whereby the service verifying system can determine whether the service is providable for the service utilizing terminal, by simply determining whether the status of the permission message on which the message transmitted in the second message transmitting step is based is in the available status, without need for identifying the user of the service utilizing terminal. By using the authentication result of the first service in the utilization of the second service, as described above, there is no need for building up a new authenticating means in provision of the second service from the start, whereby it is feasible to curtail the cost and system design time. A method of informing the service utilizing terminal of the permission response received by the authentication requesting terminal can be any method. For example, the response can be transmitted from the authentication requesting terminal to the service utilizing terminal by near field wireless communication, or the user looking at the authentication requesting terminal can manually enter necessary information into the service utilizing terminal. The authentication requesting terminal and the service utilizing terminal can be configured as a single terminal, and this configuration is preferable in that the permission message can be transmitted inside the terminal.

The above service providing method may be configured as a method wherein the second message receiving step receives a message further based on additional information, and wherein the service provision propriety determining step determines whether the second service is providable, further based on the additional information in the additional information storing means.

The further use of the additional information as in the above configuration enhances the security and permits the second service to be provided more safely. Conceivable examples of the additional information include identification information to distinguish the service utilizing terminal, authentication information to authenticate the service utilizing terminal, and so on.

The above service providing method may be configured as a method further comprising an area information updating step of, on the occasion of receiving the utilization request in the other service utilization request transmitting step, deriving available area information from information about a staying area of the authentication requesting terminal and storing the available area information into area information storing means, wherein the service provision propriety determining step further verifies whether a staying area of the service utilizing terminal is within an area where the service is available, based on the available area information in the area information storing means, and determines that the second service is providable, when a staying area of the service utilizing terminal is within an area where the service is available.

When the service providing method is configured in such a way that when in the other service utilization request transmitting step the utilization request for utilization of the second service is received by the service verifying system, the available area of the second service is derived from the staying area of the authentication requesting terminal and is stored as available area information into the area information storing means and that when in the second message transmitting step the message is transmitted from the service utilizing terminal, it is determined whether the service utilizing terminal is within the available area stored in the area information storing means, to determine the propriety of provision of the second service, the service utilizing terminal is allowed to utilize the second service in the permitted area only, whereby the security can be enhanced, while reducing opportunities of misuse.

The above service providing method may be configured as a method wherein when the permission response is enable, based on the message information in the available message information storing means, and when the staying area of the authentication requesting terminal moves off the available area proved by available area information storing means, the area information updating step stores the available area information derived from information about the staying area after the movement of the terminal, in the area information storing means.

With movement of the staying area of the authentication requesting terminal authenticated, as described above, the available area information in the area information storing means is updated, whereby it also becomes feasible to adapt to cases where the user moves.

The above service providing method may be configured as a method wherein when the permission response is enable, based on the message information in the available message information storing means, and when the staying area of the authentication requesting terminal moves off the available area proved by the area information storing means, when the authentication requesting terminal transmits the utilization request for utilization of the second service in the other service utilization request transmitting step, the area information updating step stores the available area information derived from information about the staying area after the movement of the terminal, in the area information storing means.

After movement of the staying area of the first terminal (authentication requesting terminal) authenticated, the available area information is derived from the staying area of the first terminal at the time of receiving the other service utilization request in the other service utilization request receiving step, as described above, whereby it also becomes feasible to adapt to cases where the user moves.

The above service providing method may be configured as a method further comprising a time information updating step of, on the occasion of receiving the utilization request in the other service utilization request transmitting step, storing available time information about a time period in which the second service is available, into time information storing means, wherein the service provision propriety determining step further verifies whether a time when the service verifying system receives the message in the second message transmitting step is within the time period in which the service is available, based on the available time information stored in the time information storing means, and wherein when the time of reception of the message is within the time period in which the second service is available, the service provision propriety determining means determines that the second service is providable.

When the method is configured in such a way that the available time period of the second service is stored as available time information in the time information storing means and that upon transmission of the message from the second terminal (service utilizing terminal) in the second message transmitting step it is determined whether the reception time of the message is within the available time period, to determine the propriety of provision of the second service, the second terminal is allowed to utilize the second service within the permitted time period only, whereby the security can be enhanced, while reducing opportunities of misuse. The available time period of the second service can be set, for example, by a method of setting a period of some minutes after transmission of the permission response to the authentication requesting terminal, or by a method of setting the time period according to a type of the second service.

The above service providing method may be configured as a method wherein the permission response transmitting step transmits the permission response further based on available area information derived from information about a staying area of the authentication requesting terminal, and wherein the service provision propriety determining step further verifies whether a staying area of the service utilizing terminal is within an area where the service is available, based on the message received by the second message receiving means, and determines that the second service is providable, when a staying area of the service utilizing terminal is within an area where the service is available.

When the method is configured in such a way that upon reception of the utilization request for utilization of the second service the area information about the available area of the second service is derived from the staying area of the first terminal, (authentication requesting terminal) that the permission response further based on the available area information is transmitted to the first terminal, and that upon transmission of the message from the second terminal (service utilizing terminal) it is determined whether the second terminal is in the available area on which the message is based, to determine the propriety of provision of the second service, the second terminal is allowed to utilize the second service in the permitted area only, whereby the security can be enhanced, while reducing opportunities of misuse, and whereby the service verifying system can be constructed in the configuration without need for storing the information about the available area.

The above service providing method may be configured as a method wherein the permission response transmitting step transmits the permission response further based on available time information, and wherein the service provision propriety determining step further verifies whether a time when the service verifying system receives the message in the second message transmitting step is within a time period derived from the message received by the second message receiving means, and wherein when the time of reception of the message is within the time period in which the service is available, based on the message received by the second message receiving means, the service provision propriety determining means determines that the second service is providable.

When the method is configured in such a way that the permission response further based on the available time information about the available time period of the second service is transmitted to the first terminal and that upon transmission of the message from the second terminal it is determined whether the reception time of the message is within the available time period on which the message is based, to determine the propriety of provision of the second service, the second terminal is allowed to utilize the second service in the permitted time period only, whereby the security can be enhanced, while reducing opportunities of misuse, and whereby the service verifying system can be constructed in the configuration without need for storing the information about the available time period.

According to the present invention, it is determined whether the second service is available to the user of the authentication requesting terminal, in the state in which the user of the authentication requesting terminal is authenticated as a qualified user by the authentication conducted by the authenticating means, so that the authentication of the second service can be omitted by making use of the authentication result of the first service. Then the permission message to distinguish the permission of utilization is stored and the permission response based on the permission message is transmitted to the authentication requesting terminal. When the utilization request message based on the utilization response informed of by the authentication requesting terminal is transmitted from the second terminal, the message status information of the permission message on which the utilization request message is based is verified on the basis of the permission message status DB, and when it is in the available status, the second service is provided for the second terminal. This permits the service verifying system to determine the propriety of provision of the service for the second terminal by only verifying the status of the permission message, without need for identifying the user of the second terminal. As described above, the use of the authentication result of the first service in the utilization of the second service obviates the need for building up the new authenticating means in provision of the second service from the start and thus can reduce the cost and design time.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention may be more readily described with reference to the accompanying drawings, in which:

FIG. 2 is an illustration showing an example of data items stored in an authentication information DB;

DESCRIPTION OF THE PREFERRED EMBODIMENTS

The preferred embodiments of the service verification network system according to the present invention will be described below in detail with reference to the drawings. The same elements will be denoted by the same reference symbols throughout the description of the drawings, without redundant description.

First Embodiment

Figure 1:
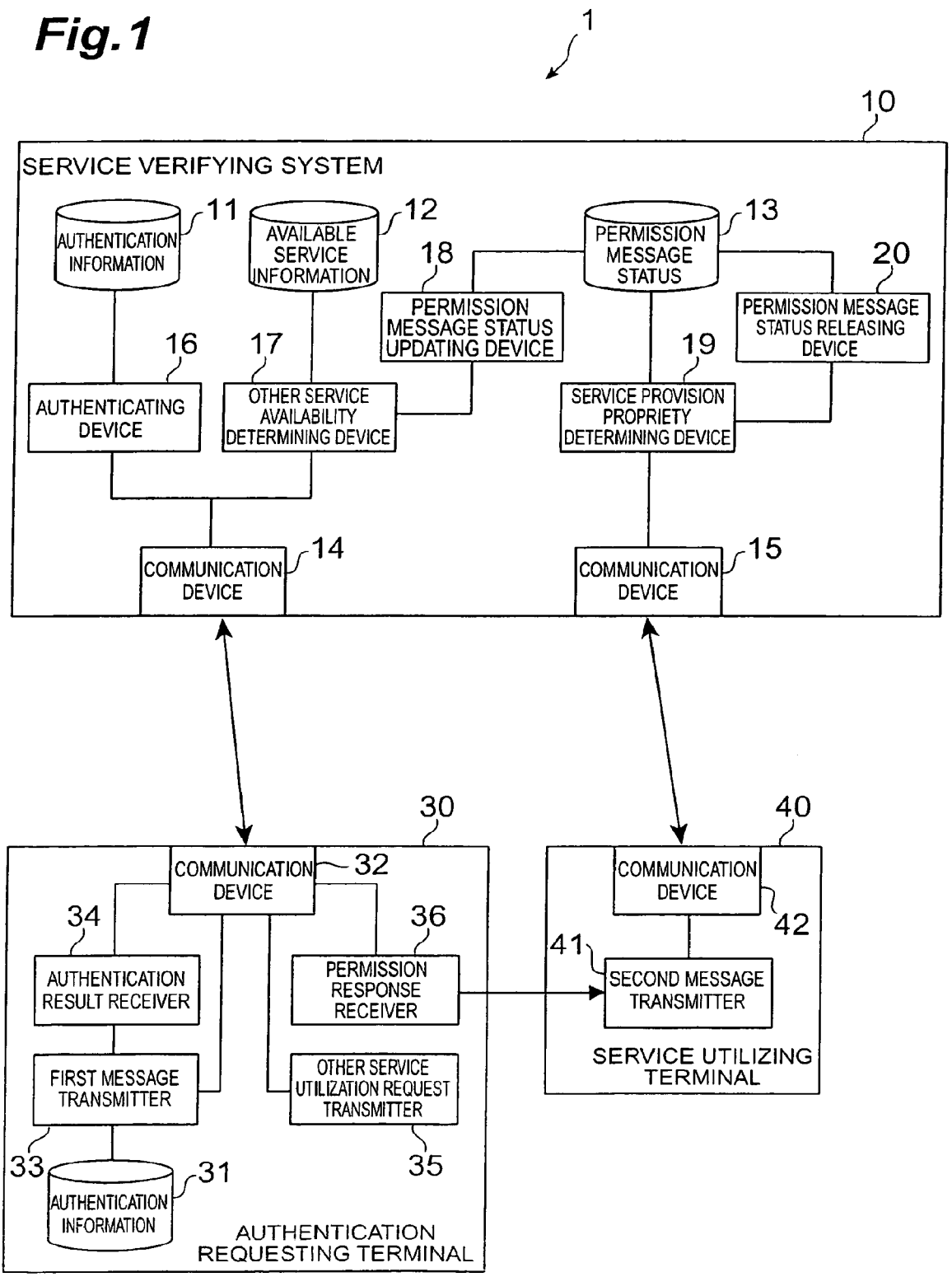
FIG. 1 is a block diagram showing a configuration of a service verification network system according to an embodiment.

FIG. 1 is a block diagram showing the configuration of service verification network system 1 according to the first embodiment of the present invention. As shown in FIG. 1, the service verification network system 1 has service verifying system 10, authentication requesting terminal 30, and service utilizing terminal 40. Each of the components will be first outlined. The service verifying system 10 has a function of providing a plurality of services. The authentication requesting terminal 30 is a terminal utilizing a service A (first service) provided by service verifying system 10 and terminal to be authenticated by service verifying system 10 in order to utilize the service A. The service utilizing terminal 40 is a terminal utilizing another service B (second service) provided by service verifying system 10. An example of the services provided in the service verification network system 1 according to the present embodiment include the wireless telephone service as service A and the wireless LAN service as service B; in this case, the authentication requesting terminal 30 can be assumed to be a mobile phone terminal and the service utilizing terminal 40 a PC with a wireless LAN card. The authentication requesting terminal 30 and service utilizing terminal 40 may be configured as a single terminal. An example of the single terminal can be assumed to be Doccimo (registered trademark) which is a single terminal capable of using both the mobile phone and PHS services, for example.

Service verifying system 10 is provided with three databases of authentication information storing device (referred to as "authentication information DB") 11, available service information storing device (referred to as "available service information DB") 12, and permission message status storing device (referred to as "permission message status DB") 13, communication devices 14, 15 for communications with the respective terminals of authentication requesting terminal 30 and service utilizing terminal 40, authenticating device 16, other service availability determining device 17, permission message status updating device 18, service provision propriety determining device 19, and permission message status releasing device 20. Although the service verifying system 10 is constructed as a single device herein, it may also be constructed of a plurality of devices. For example, service verifying system 10 may be separated into a first device comprised of authentication information DB 11, authenticating device 16, and communication device 14; a second device comprised of available service information DB 12, other service availability determining device 17, communication device 14, permission message status updating device 18, and permission message status DB 13; and a third device comprised of service provision propriety determining device 19, communication device 15, and permission message status updating device 20. Although the service verifying system 10 is provided with three databases herein, it may also be provided with two databases, authentication information DB and available service information DB.

Authentication information DB 11 is a database storing authentication information for authenticating users to which the service A is available. FIG. 2 is an illustration showing an example of data items stored in authentication information DB 11. As shown in FIG. 2, authentication information DB 11 stores data of items indicated by "ID," "password," "shared secret," "private key," "public key," and "authentication method." Concerning the items other than "ID," the contents of data are omitted from illustration. "ID" is identification information for identifying users to which the service A is available. Each of the information of "password," "shared secret," "private key," and "public key" is information necessary for authentication. "Authentication method" is information indicating which method is used for authentication, and the inclusion of this information permits the system to change methods of authentication according to users. Authentication information DB 11 may be configured to store data of items other than the data items shown in FIG. 2.

Figure 3:
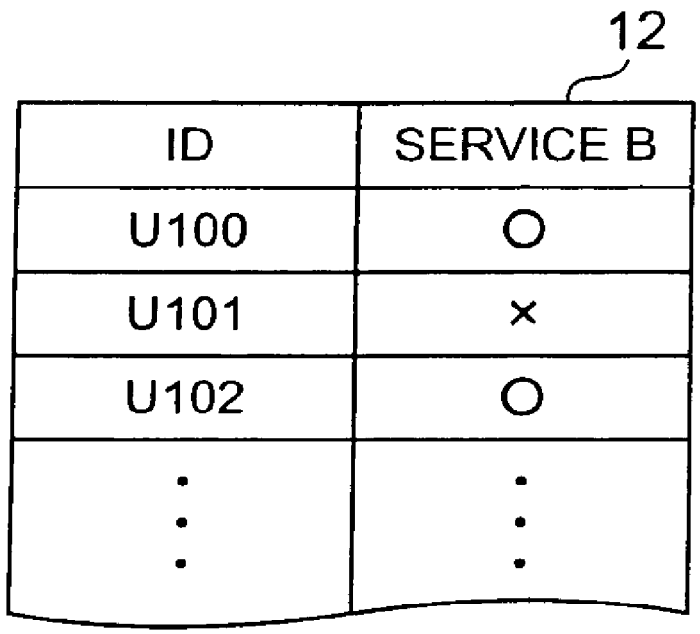
FIG. 3 is an illustration showing an example of data items stored in an available service information DB.

Available service information DB 12 is a database storing information about services available to respective users. FIG. 3 is an illustration showing an example of data items stored in available service information DB 12. As shown in FIG. 3, available service information DB 12 stores data of items indicated by "ID" and "service B." "ID" is identification information for identifying users, just as the ID in authentication information DB 11 was. "Service B" is a service different from the service A, which is provided by service verifying system 10. The example herein has the information about the service B, and as to this item, if there are other services provided by service verifying system 10, items stored in the available service information DB 12 increase or decrease according to the number of services. It is seen with reference to FIG. 3 that the user with ID of U100 is allowed to utilize the service B as well as the service A and that the user with ID of U101 is not allowed to utilize the service B.

Figure 4:
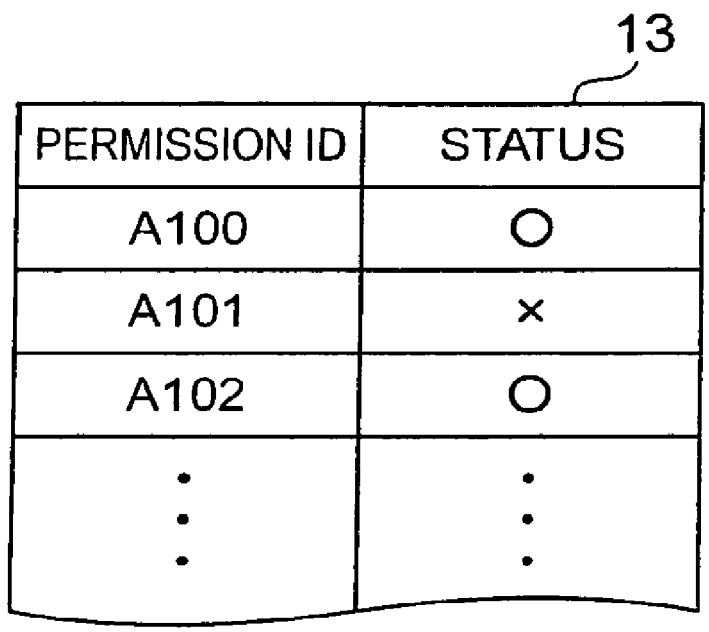
FIG. 4 is an illustration showing an example of data items stored in an available permission message status DB.

Permission message status DB 13 is a database that, on the occasion of permitting utilization of the service B different from the service A, stores message status information of a permission message to distinguish the permission of the utilization. FIG. 4 is an illustration showing an example of data items stored in permission message status DB 13. As shown in FIG. 4, permission message status DB 13 stores data of items indicated by "permission ID" and "status." "Permission ID" is identification information for identifying a permission message. A permission ID identifies a permission of utilization of the service B for a certain user. The permission ID may be a permission message itself, and in the present example the permission ID is assumed to be a permission message. "Status" is information indicating whether the service B indicated by the permission ID is available. When the system provides a plurality of services, permission message status DB 13 is configured to have tables as shown in FIG. 4, for the respective services. The permission message status DB 13 according to the present embodiment stores the permission IDs (permission messages) and has a role as the permission message information storing means for storing the message information for restoring the permission messages. In the present example the permission message status information DB 13 stores the permission messages and message status information together, but it is also possible to employ a configuration having storages for separately storing such information entities. When the permission messages and message status information are separately stored, the two information entities can be correlated with each other, for example, by permission IDs.

Communication device 14 has a function of conducting communication with authentication requesting terminal 30. Specifically, communication device 14 has the following functions: 1) a function as the first message receiving means for receiving the authentication information transmitted from authentication requesting terminal 30; 2) a function as the authentication result transmitting means for transmitting the result of the authentication to authentication requesting terminal 30; 3) a function as the other service utilization request receiving means for receiving a utilization request for utilization of the service B transmitted from authentication requesting terminal 30; 4) a function as the permission response transmitting means for transmitting a permission response to authentication requesting terminal 30 when the service B is available; and so on.

The communication device 15 has a function of conducting communication with service utilizing terminal 40. Specifically, this communication device 15 has the following functions: 1) a function as the second message receiving means for receiving a utilization request for utilization of the service B transmitted from service utilizing terminal 40; 2) a function of providing the service for service utilizing terminal 40; and so on. A message of the utilization request for utilization of the service transmitted from service utilizing terminal 40 is based on a permission response received by authentication requesting terminal 30. In the present example the system is constructed by adopting the configuration having the two communication devices 14, 15 for communicating with the respective terminals of authentication requesting terminal 30 and service utilizing terminal 40, but a single communication device will suffice for communications with each of the terminals 30, 40 if the same communication protocol is applied to communications with authentication requesting terminal 30 and with service utilizing terminal 40.

Authenticating device 16 has a function of, using a message received by communication device 14 from authentication requesting terminal 30, identifying the user of authentication requesting terminal 30 and authenticating whether the service A is available to the user. The authenticating device 16 is connected to authentication information DB 11 and verifies the authentication information in the message received from the authentication requesting terminal 30, based on the authentication information stored in authentication information DB 11, to authenticate whether the user of authentication requesting terminal 30 having transmitted the message is a qualified user. The authentication herein can be implemented by adopting the method of ID and password matching, the public key cryptography, or the like. After the user is authenticated as a qualified user, the user becomes allowed to utilize the service A provided by service verifying system 10, through authentication requesting terminal 30.

Other service availability determining device 17 has a function of, when communication device 14 receives a utilization request for utilization of the other service transmitted from the authentication requesting terminal 30, determining whether the service is available to the user of authentication requesting terminal 30. The other service availability determining device 17 is connected to available service information DB 12, and, on the occasion of transmission of the utilization request for utilization of the other service, it determines whether the service is available to the user of the authentication requesting terminal 30, with reference to available service information DB 12. For example, in the case of the available service information DB 12 shown in FIG. 3, where the utilization request for utilization of the service B is received from authentication requesting terminal 30 authenticated as the user ID of U101, the other service availability determining device 17 determines that the service is unavailable.

Permission message status updating device 18 has a function of updating the permission message status DB 13. Specifically, where the other service availability determining device 17 determines that the other service is available, the permission message status updating device 18 assigns a permission of the utilization an ID (permission ID) and updates the database so as to add the new ID. The "status" at this time becomes available (as indicated by mark o in FIG. 3).

Service provision propriety determining device 19 has a function of, when communication device 15 receives a service utilization request from service utilizing terminal 40, determines whether the service B is providable for service utilizing terminal 40. Service provision propriety determining device 19 verifies the message status information of the permission message on which the utilization request message is based, on the basis of permission message status DB 13, to determine whether the service is providable. When the status of the permission message is available, the service B is determined to be providable.

Permission message status releasing device 20 has a function of updating the status of a permission message from the available status to an unavailable status when a message is transmitted from service utilizing terminal 40 and when service provision propriety determining device 19 determines that the service is providable. Namely, when the other service is provided once upon reception of the utilization request containing the utilization permission message, the status is updated to the unavailable status (as indicated by mark x in FIG. 3). By avoiding acceptance of multiple utilization requests using one utilization message in this way, the risk of abuse by third parties can be reduced even if the third parties come to know the permission message.

Next, authentication requesting terminal 30 according to the present embodiment will be described. The authentication requesting terminal 30 according to the present embodiment has authentication information storing device (referred to as "authentication information DB") 31, first message transmitting device 33, authentication result receiving device 34, other service utilization request transmitting device 35, permission response receiving device 36, and communication device 32, as shown in FIG. 1.

Authentication information DB 31 is a database storing the authentication information for utilization of the first service, in which items of data stored are the same as in authentication information DB 11 of service verifying system 10 (cf. FIG. 2).

First message transmitting device 33 has a function of extracting the authentication information stored in authentication information DB 31 and transmitting a message for authentication to service verifying system 10. The information extracted from authentication information DB 31 differs depending upon the authentication methods; for example, in the case of the authentication by a password, the information extracted includes an ID, a password, and an authentication method; in the case of the authentication by private key cryptography, the information extracted includes an ID, a private key, and an authentication method, and a predetermined message is encrypted by the private key. In either case, the information about the authentication method is information necessary for matching of the authentication method between authentication requesting terminal 30 and service verifying system 10.

Authentication result receiving device 34 has a function of receiving the result of the authentication transmitted from service verifying system 10.

Other service utilization request transmitting device 35 has a function of transmitting a utilization request for utilization of the service B. Other service utilization request transmitting device 35 transmits the utilization request for utilization of the service B when it is determined that the service A is available, based on the result of the authentication received by authentication result receiving device 34.

Permission response receiving device 36 has a function of receiving a permission response based on a permission message transmitted from service verifying system 10.

Communication device 32 has a function of performing communication with service verifying system 10.

Service utilizing terminal 40 according to the present embodiment will be described below. Service utilizing terminal 40 has second message transmitting device 41 and communication device 42, as shown in FIG. 1.

Second message transmitting device 41 has a function of preparing and transmitting a message to request utilization of the service B different from the authenticated service A. Second message transmitting device 41 prepares a message based on the permission response received through permission response receiving device 36 by authentication requesting terminal 30. For example, the message of utilization request can be prepared by processing the permission response by a predetermined function. In this method, the permission message is not revealed at authentication requesting terminal 30 and at service utilizing terminal 40, and it is thus feasible to decrease the risk of leakage of the information. Any method can be adopted as a method of transmitting the permission response from authentication requesting terminal 30 to service utilizing terminal 40. For example, authentication requesting terminal 30 and service utilizing terminal 40 can be made communicable by near field wireless communication, or may be connected by a cable. The permission response may also be transmitted by letting the user enter the permission message displayed on a display device of authentication requesting terminal 30, into service utilizing terminal 40.

Figure 5:
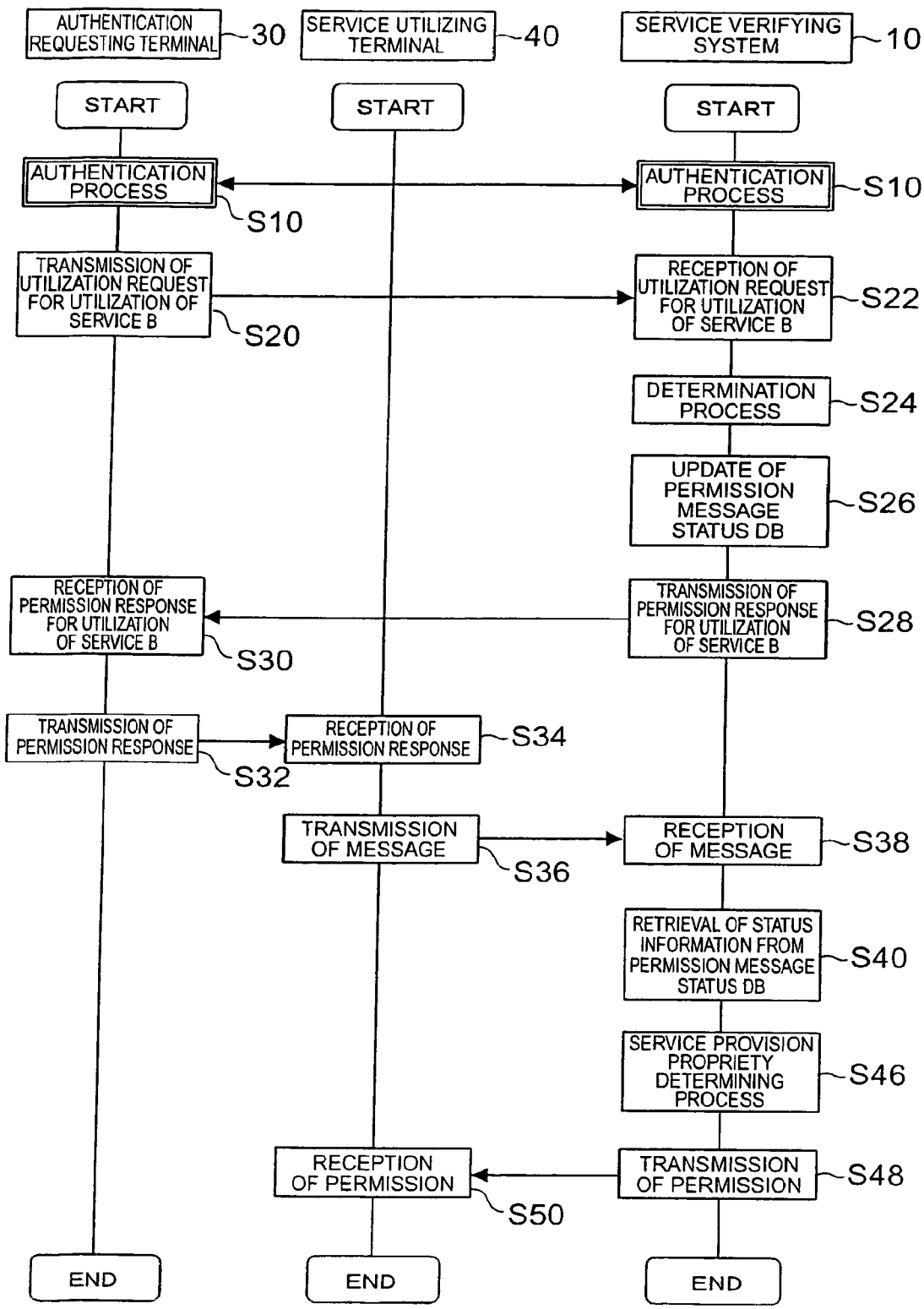
FIG. 5 is a flowchart showing the operation of the service verification network system according to the first embodiment.
Figure 6:
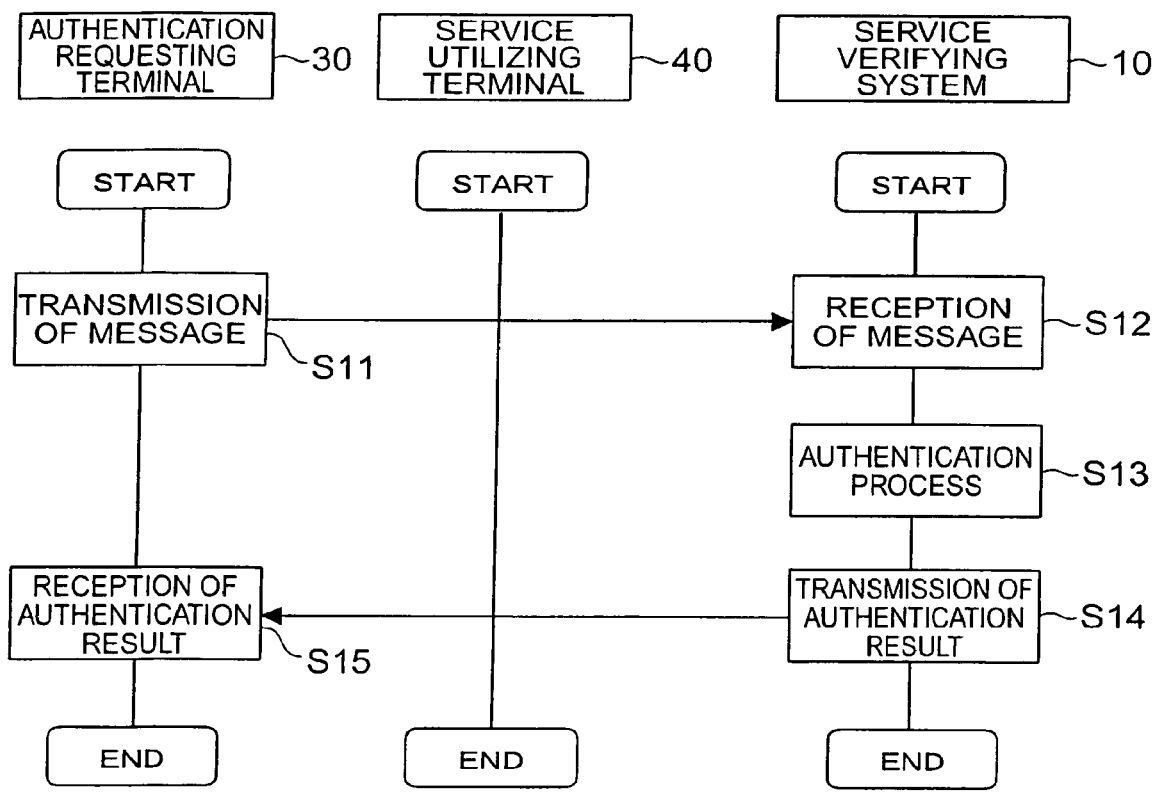
FIG. 6 is a flowchart showing the authentication process.

The operation of service verification network system 1 according to the present embodiment will be described below with reference to FIGS. 5 and 6, along with the service providing method of the embodiment.

First, authentication requesting terminal 30 goes into the authentication process for utilization of the service A (S10) The authentication process will be described in detail with reference to FIG. 6. The authentication requesting terminal 30 first transmits a message based on the authentication information to service verifying system 10 (S11). When receiving the message transmitted from authentication requesting terminal 30 (S12), service verifying system 10 performs the authentication process based on the received message (S13). Service verifying system 10 analyzes the authentication information in the message transmitted from authentication requesting terminal 30, to authenticate the authentication requesting terminal 30 on the basis of the authentication information stored in authentication information DB 11. After completion of the authentication process, service verifying system 10 transmits the result of the authentication to authentication requesting terminal 30 (S14). Let us suppose herein that the user of authentication requesting terminal 30 is authenticated as a qualified user and the service A is available to the user. When the user of authentication requesting terminal 30 is not authenticated as a qualified user, authentication requesting terminal 30 is not allowed to utilize the service A. Authentication requesting terminal 30 receives the authentication result transmitted from service verifying system 10 (S15). When the authentication result received by authentication requesting terminal 30 is one indicating the affirmative authentication, authentication requesting terminal 30 is allowed to utilize the service A. The flow heretofore is the same as in the conventional service verification network systems, and the authentication of the user is carried out in order to utilize the predetermined service.

Reference is made again to FIG. 5. Next, authentication requesting terminal 30 transmits a utilization request for utilization of the service B different from the service A to service verifying system 10 (S20). When receiving the utilization request for utilization of the other service transmitted from authentication requesting terminal 30 (S22), service verifying system 10 determines whether the service B is available to the user of authentication requesting terminal 30 (S24). Specifically, whether the service B is available is determined based on available service information DB 12 storing the information about the service available to the user of authentication requesting terminal 30 by a contract or the like. Since the user is identified by the authentication process, the information about the available service is extracted from available service information DB 12. For example, where the user is one with user ID of U100, the service B is determined to be available (cf. FIG. 3). Let us suppose herein that the service B is determined to be available. When the service B is determined to be available, service verifying system 10 assigns a permission ID (permission message) to distinguish a permission of utilization of the service B for the user, and updates the permission message status DB 13 (S26). For example, suppose "A102" on the third line in permission message status DB 13 shown in FIG. 4 was added as a new permission message. The permission message is first added in the status of "available" (as indicated by "o" in FIG. 4).

Then service verifying system 10 transmits a permission response about the service B to the utilization request, to authentication requesting terminal 30 (S28). When receiving the permission response (S30), authentication requesting terminal 30 transmits the received permission response to service utilizing terminal 40. In the present embodiment, supposing authentication requesting terminal 30 is wirelessly communicable with service utilizing terminal 40, authentication requesting terminal 30 wirelessly transmits the permission response to service utilizing terminal 40 (S32), and service utilizing terminal 40 receives the permission response (S34).

When receiving the permission response transmitted from authentication requesting terminal 30 (S34), service utilizing terminal 40 prepares a message to request utilization of the service B, based on the permission response, and the service utilizing terminal 40 transmits the prepared message to service verifying system 10 (S36). When receiving the message transmitted from service utilizing terminal 40 (S38), service verifying system 10 analyzes the permission message on which the received message is based, and retrieves the message status information from permission message status DB 13 (S40). Subsequently, it is determined whether the permission message on which the received message is based is in the available status and the consistency is determined about whether the received message itself is correctly configured, to determine the propriety of provision of the service (S46). For example, suppose the permission message extracted from the utilization request is "A102." According to permission message status DB 13, the status of the message is "o" and is thus judged as available, so that service verifying system 10 can provide the service for the service utilizing terminal 40. Where the service is providable, permission message status releasing device 20 changes the status of the permission message stored in permission message status DB 13, from the available status into the unavailable status, so as to release the available status of the service B.

Then service verifying system 10 transmits a permission response to service utilizing terminal 40 (S48) and service utilizing terminal 40 receives the permission response transmitted from the service providing terminal (S50), whereby service utilizing terminal 40 becomes allowed to utilize the service B. The above completes the operation flow of service verification network system 1 according to the present embodiment.

The service verifying system 10 (service verification network system 1) according to the present embodiment is provided with authenticating device 16 for determining whether the service A is available, other service availability determining device 17, and permission message status DB 13, and is configured to let authenticating device 16 identify the user and determine whether the service B is available, in the state in which the service A is made available. This makes it feasible to determine the availability of service B, without need for authentication. When the service B is determined to be available, the message status information indicating that the permission message is available in the permission of the utilization is stored into permission message status DB 13 and the permission response based on the permission message is transmitted to authentication requesting terminal 30. This permits service verifying system 10 to perform such operation that when the message based on the permission response is transmitted thereto, it provides the service B for service utilizing terminal 40 having transmitted the message, without need for authentication. Therefore, where service verifying system 10 providing the service A starts providing new service B, service verifying system 10 can be prepared at low cost and in short time by making use of the authentication result of service A by authenticating device 16, without need for constructing new authenticating device 16 for authenticating users authorized to utilize the service B.

Since the service providing method according to the present embodiment is configured to identify the user of authentication requesting terminal 30 by the authenticating process, receive the utilization request for utilization of service B in the state in which the service A is made available, and then perform the determination on the utilization of service B, it can determine the propriety of provision of service B by simply determining whether the service B is available to the identified user, without need for new authentication. When the service B is determined to be available, the permission message is given to the permission of utilization thereof, the message status information indicating the status of "available" is stored into permission message status DB 13, and the permission response based on the permission message is transmitted to authentication requesting terminal 30. In the present service providing method configured in this manner, when the utilization request containing the permission message is transmitted, the service B can be provided for service utilizing terminal 40 having transmitted the utilization request, without authentication. Accordingly, where service verifying system 10 providing the service A starts providing new service B, service verifying system 10 can be prepared at low cost and in short time by making use of the authentication result of service A by authenticating device 16, without need for constructing new authenticating device 16 for authenticating users authorized to utilize the service B.

Second Embodiment

Figure 7:
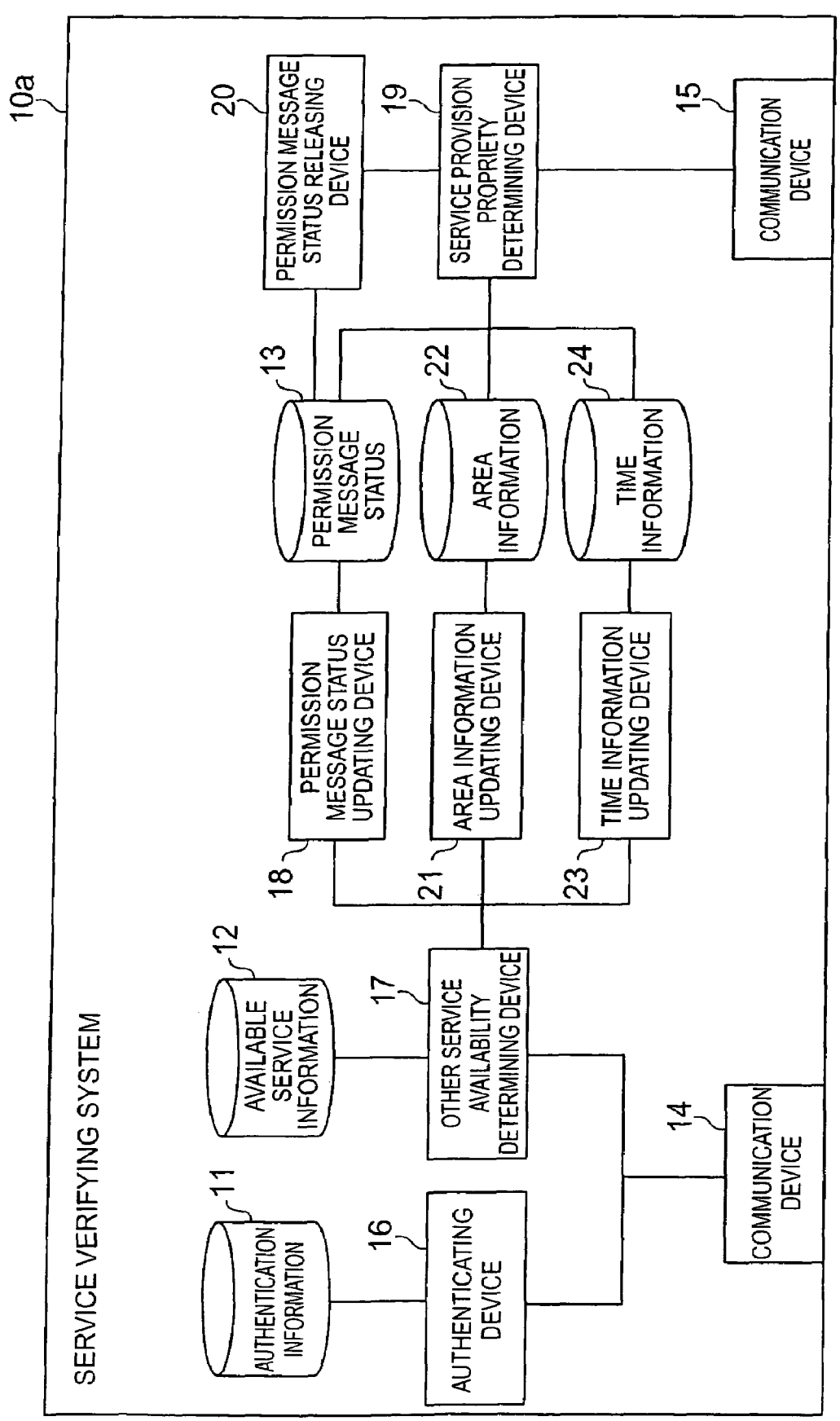
FIG. 7 is a block diagram showing a configuration of a service verifying system according to the second embodiment.

Next, the service verification network system according to the second embodiment of the present invention will be described. The service verification network system of the second embodiment is basically identical in structure as the service verification network system of the first embodiment, but is different in the structure of service verifying system 10a. FIG. 7 is a block diagram showing the configuration of service verifying system 10a according to the second embodiment. As shown in FIG. 7, service verifying system 10a according to the second embodiment is further provided with area information storing device (referred to as "area information DB") 22, area information updating device 21, time information storing device (referred to as "time information DB") 24, and time information updating device 23, in addition to the configuration of service verifying system 10 according to the first embodiment.

Area information DB 22 is a database storing available area information about areas where the second service is available.

Figure 8:
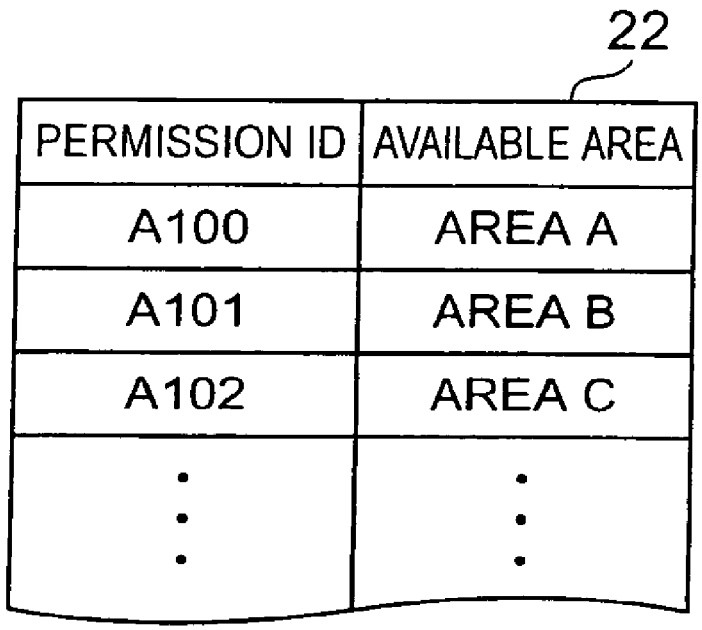
FIG. 8 is an illustration showing an example of data stored in an area information DB.

FIG. 8 is an illustration showing an example of data stored in area information DB 22. Area information DB 22 stores each information of "permission ID" and "available area." "Permission ID" is identification information for identifying each permission message and is the same as that stored in permission message status DB 13. The "available area" is information about each area where the second service is available, and the service is not provided unless service utilizing terminal 40 is located within the available area. The available area information herein is associated with the permission ID, but the data structure does not always have to be constructed in this way; for example, the available area information may be stored in correlation with identification information of authentication requesting terminal 30 or the like, or may be stored independently of other information.

Area information updating device 21 has a function of updating area information DB 22. When other service availability determining device 17 determines that the service B is available, area information updating device 21 derives an available area to make the service B available, from the staying area of authentication requesting terminal 30 having transmitted the request for the utilization of the service. For example, an area including the staying area of authentication requesting terminal 30 can be defined as an available area, or part of the staying area of authentication requesting terminal 30 can be defined as an available area. It is a matter of course that the available area can agree with the staying area of authentication requesting terminal 30. The available area information thus derived is stored into area information DB 22. When the staying area varies because of movement of authentication requesting terminal 30 for which the utilization of the other service has already been permitted and to which the message status information in permission message status DB 13 is available, authentication requesting terminal 30 again transmits a utilization request for utilization of the other service. On this occasion, an available area is also derived from the staying area of authentication requesting terminal 30 an0d the available area information newly derived is stored to update area information DB 22. Since the permission response to the utilization request for the other service has already been transmitted, no permission response is transmitted in this case. In this configuration, the available area can always be kept up-to-date in accordance with the staying area of authentication requesting terminal 30, and service verifying system 10*a* needs to only update the permission message status DB 13 on the occasion of again receiving the request for utilization of the other service, without need for monitoring the staying area of every authentication requesting terminal 30 under connection, which can reduce the load on service verifying system 10.

Figure 9:
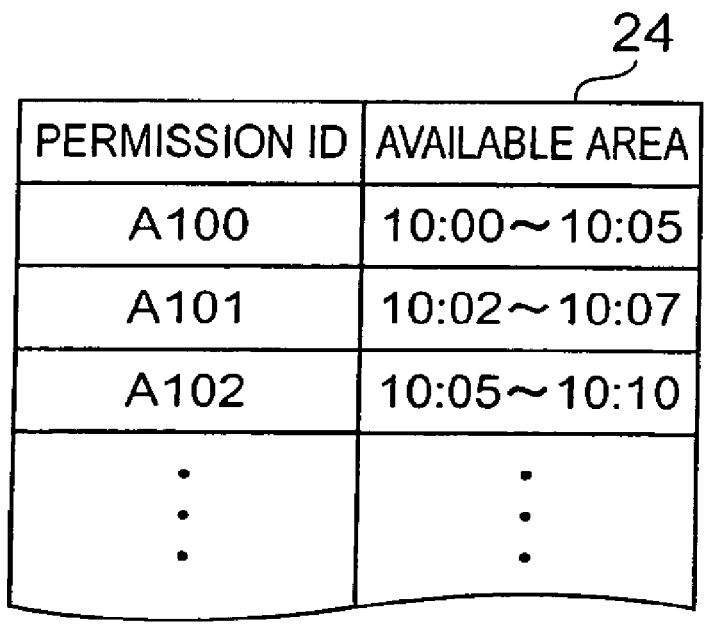
FIG. 9 is an illustration showing an example of data stored in a time information DB.

Time information DB 24 is a database storing available time information about time periods in which the second service is available. FIG. 9 is an illustration showing an example of data stored in time information DB 24. Time information DB 24 stores each information of "permission ID" and "available time period." The "permission ID" is identification information for identifying each permission message and is the same as that stored in permission message status DB 13. The "available time period" is information about time periods in which the second service is available, and the service is not provided unless a utilization request message of the second service is received within an available time period from the service utilizing terminal. The available time information herein is associated with the permission ID, but the data structure does not always have to be constructed in this way; for example, the available time information may be stored in correlation with the identification information of authentication requesting terminal 30 or the like, or it may be stored independently of other information.

Time information updating device 23 has a function of updating time information DB 24. When other service availability determining device 17 determines that the service B is available, time information updating device 23 sets an available time period in which the service B is made available. For example, each available time period can be set as a period of ten minutes after a time of making the determination on the utilization request for the other service, or available time periods can be set for respective services, e.g., five minutes for service B and ten minutes for service C different from service B. Then time information updating device 23 stores the set available time information into area information DB 22.

Figure 10:
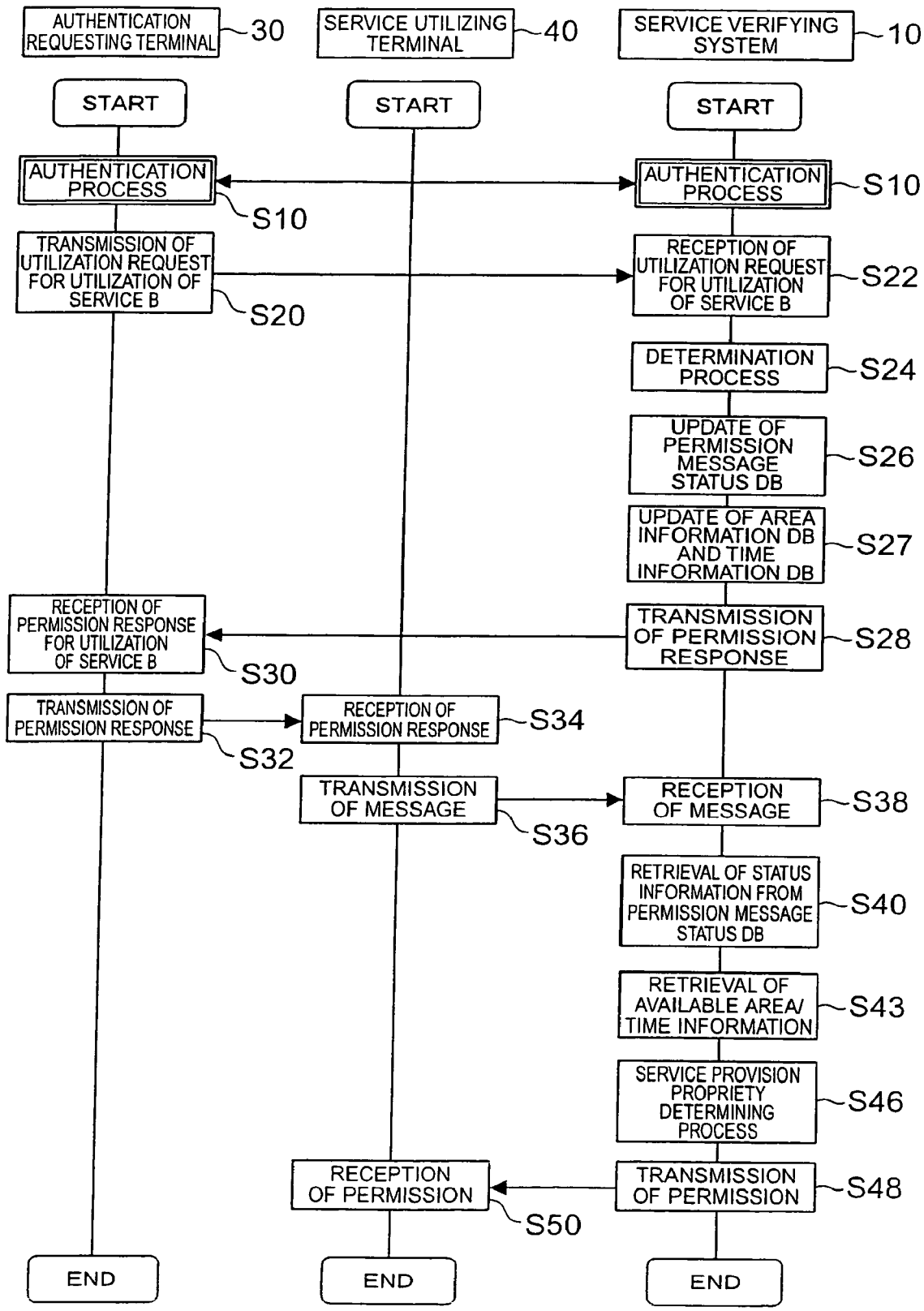
FIG. 10 is a flowchart showing the operation of the service verification network system according to the second embodiment.

Next, the operation of the service verification network system according to the second embodiment will be described with reference to FIG. 10, along with the service providing method according to the second embodiment.

First, authentication requesting terminal 30 goes into the authentication process for utilization of service A (S10). This step is the same as the step of authentication in the first embodiment (cf. FIG. 6).

Next, authentication requesting terminal 30 transmits a utilization request for utilization of service B different from the service A to service verifying system 10*a* (S20). When receiving the utilization request for utilization of the other service transmitted from authentication requesting terminal 30 (S22), service verifying system 10*a* determines whether the service B is available to the user of authentication requesting terminal 30 (S24). Let us suppose herein that the service B is determined to be available. When the service B is determined to be available, service verifying system 10*a* assigns a permission ID to distinguish a permission of utilization of the service B for the user, and updates permission message status DB 13 (S26). The permission message is first added in the status of "available" (as indicated by symbol o in FIG. 4).

Subsequently, service verifying system 10*a* derives the available area information about an available area of the second service from the staying area of authentication requesting terminal 30 by area information updating device 21, and stores the information into area information DB 22. Service verifying system 10*a* also sets available time information about an available time period of the second service by time information updating device 23, and stores the information into time information DB 24.

Then service verifying system 10*a* transmits a permission response based on a permission message about the service B to the utilization request, to authentication requesting terminal 30 (S28). When receiving the permission response (S30), authentication requesting terminal 30 transmits the received permission response to service utilizing terminal 40. In the present embodiment, supposing authentication requesting terminal 30 is wirelessly communicable with service utilizing terminal 40, authentication requesting terminal 30 wirelessly transmits the permission response to service utilizing terminal 40 (S32), and service utilizing terminal 40 receives the permission response (S34).

When receiving the permission response transmitted from authentication requesting terminal 30 (S34), service utilizing terminal 40 prepares a message to request utilization of the service B, based on the permission response, and the service utilizing terminal 40 transmits the prepared message to service verifying system 10*a* (S36). When receiving the message transmitted from service utilizing terminal 40 (S38), service verifying system 10*a* analyzes the permission message on which the received message is based, and retrieves the message status information from permission message status DB 13 (S40) Subsequently, it is determined whether the permission message on which the received message is based is in the available status and the consistency is determined about whether the received message itself is correctly configured, based on permission message status DB 13. Service verifying system 10a of the second embodiment retrieves the information about the available area from area information DB 22 and retrieves the information about the available time period from time information DB 24 (S43). Then service verifying system 10a makes service provision propriety determining device 19 determine whether service utilizing terminal 40 is located within the area indicated by the available area information stored in area information DB 22. Furthermore, service provision propriety determining device 19 determines whether the time when the utilization request message for the second service was received is within the available time period stored in the time information DB 24. When these determinations end up with confirming that the service utilizing terminal is within the available area and that the message was transmitted within the available time period, service provision property determining device 19 determines that the second service is available (S46). Where the service is providable, permission message status releasing device 20 changes the status of the permission message stored in permission message status DB 13, from the available status into the unavailable status, so as to release the available status of service B.

Then service verifying system 10a transmits the permission response to service utilizing terminal 40 (S48) and service utilizing terminal 40 receives the permission response transmitted from the service providing terminal (S50), whereby service utilizing terminal 40 becomes able to utilize the service B. The above completes the operation flow of service verification network system according to the present embodiment.

Just as in the case of the service verifying system 10 according to the first embodiment, when service verifying system 10a providing the service A starts providing new service B, the service verifying system 10a of the second embodiment can utilize the authentication result of service A in authenticating device 16, without need for constructing new authenticating device 16 for authenticating users authorized to utilize the service B, whereby service verifying system 10a can be prepared at low cost and in short time.

Furthermore, since service verifying system 10a of the second embodiment stores the available area information in area information DB 22 and permits the utilization of the service within the available area, it is feasible to limit the area for utilization of the service, whereby the security can be enhanced, while reducing opportunities of misuse. Since the available time information is stored in time information DB 24 to permit the utilization of the service within the time period, it is feasible to limit the time period for utilization of the service, whereby the security can be enhanced, while reducing opportunities of misuse.

In the service providing method according to the second embodiment, similar to the service providing method according to the first embodiment, where service verifying system 10a providing the service A starts providing new service B, service verifying system 10a can be prepared at low cost and in short time by making use of the authentication result of service A by the authenticating device 16, without need for constructing new authenticating device 16 to authenticate users authorized to utilize the service B.

Third Embodiment

Next, the service verification network system according to the third embodiment of the present invention will be described. The service verification network system of the third embodiment is basically identical in structure as the service verification network system 1 according to the first embodiment (cf.

FIG. 1), but is different from service verification network system 1 of the first embodiment in the information included in the permission response transmitted from service verifying system 10 and in the information included in the utilization request transmitted from service utilizing terminal 40. The differences from the service verification network system 1 of the first embodiment will be described below.

When receiving a utilization request for utilization of the other service and determining that the other service is available, the communication device 14 of service verifying system 10 according to the third embodiment transmits a permission response, which is based on the available area information and the available time information, as well as the information about the permission message. In conjunction therewith, second message transmitting device 41 of service utilizing terminal 40 according to the third embodiment has a function of preparing a message of utilization request based on the available area information and the available time information, in addition to the information about the permission message, and transmitting the message to service verifying system 10.

Figure 11:
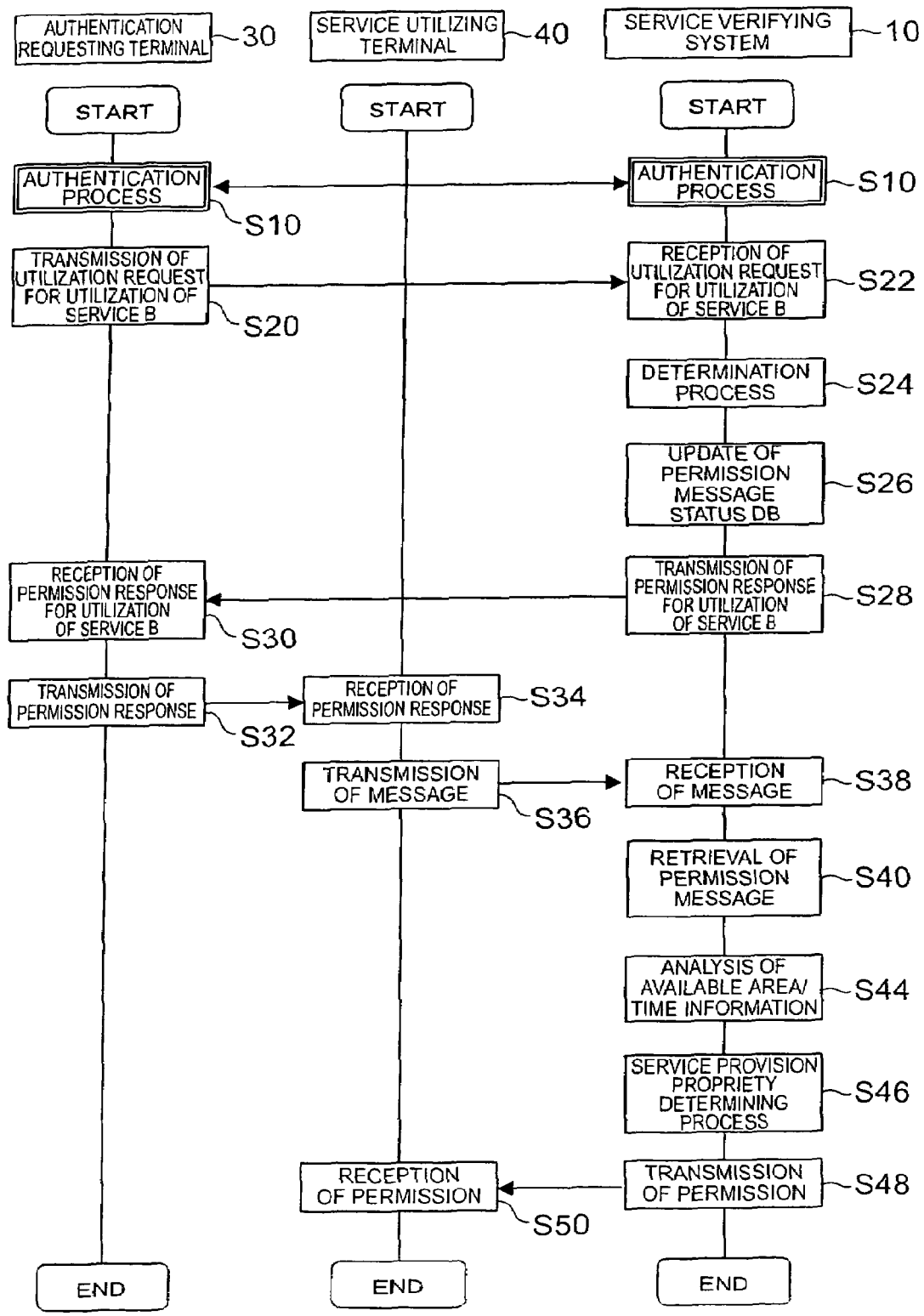
FIG. 11 is a flowchart showing the operation of the service verification network system according to the third embodiment.

Next, the operation of the service verification network system according to the third embodiment will be described with reference to FIG. 11, along with the service providing method according to the third embodiment.

Since the operation of the service verification network system according to the third embodiment is basically the same as the operation of the service verification network system 1 according to the first embodiment, only differences will be described below from the operation of service verifying system 10 according to the first embodiment. At step S28, on the occasion of transmitting the permission response for utilization of service B, the service verifying system transmits to the authentication requesting terminal 30 the permission response based on the permission message, available area information, and available time information. After receiving the permission response at step S34, the service utilizing terminal 40, on the occasion of transmitting the utilization request message at step S36, then prepares the message based on the utilization request response based on the permission message, available area information, and available time information and transmits the message to service verifying system 10 (S36). When receiving the message transmitted from service utilizing terminal 40 (S38), service verifying system 10 checks, based on permission message status DB 13, the status of the permission message on which the message is based and the consistency about whether the received message itself is correctly configured. Supposing the permission message on which the utilization request message is based is "A102," it is found that the status is "o," with reference to the permission message status DB 13. Then the service verifying system analyzes the utilization request area information and the utilization request time information on which the utilization request message received from service utilizing terminal 40 is based (S44), to determine whether the staying area of service utilizing terminal 40 is within the available area and whether the reception time of the utilization request message is within the available time period, thereby determining the propriety of provision of service B (S46).

The service verification network system and method according to the third embodiment, similar to the service verification network system 1 and method according to the first embodiment, enable the utilization of service B with the use of the authentication result of service A, so as to obviate the need for provision of the new authentication means for service B, whereby the service verifying system 10 for provision of service B can be prepared at low cost and in short time.

Since the service verification network system of the third embodiment is configured so that the permission message status DB 13 of service verifying system 10 contains neither the available area information nor the available time information, the volume of data to be stored in service verifying system 10 can be reduced.

The above detailed the embodiments of the service verification network system according to the present invention, but it is noted that the present invention is by no means intended to be limited to the above embodiments.

For example, the above second embodiment was configured to use both the available area information and the available time information in order to determine whether the service B was available, but the system may also be configured to use either one of them. This configuration can increase the speed of the provision propriety determining process on the basis of decrease in the number of determination steps, while enhancing the security.

The service utilizing terminal may further comprise an identification information storing device storing identification information to distinguish the terminal itself as additional information and may be configured to prepare the message of utilization request for service B, based on the identification information and the permission response received by authentication requesting terminal 30, and transmit the message to service verifying system 10. When this configuration is adopted, it is feasible to limit terminals permitted to utilize the second service, whereby the security can be enhanced.

The service utilizing terminal may also further comprise an authentication information storing device to store authentication information as additional information and may be configured to prepare the message of utilization request for service B, based on the authentication information and the permission response received by authentication requesting terminal 30, and transmit the message to service verifying system 10. By adopting this configuration, it is feasible to provide the second service more safely.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A service verifying system for providing a plurality of services, comprising:
    an authentication information database configured to store authentication information to authenticate a user permitted to utilize a first service;
    an available service information database configured to store information about services available to respective users;
    a permission message information database configured to, on the occasion of permitting utilization of a second service different from the first service, store message information based on a permission message to distinguish a permission of the utilization thereof;
    a first communication device configured to receive a message according to an authentication method of a first service;
    an authenticating module configured to verify the message received by the first communication device, based on the authentication information in the authentication information database, and identify a user of the first service and authenticate whether the first service is available to the user;
    the first communication device configured to receive a utilization request for utilization of the second service, which is transmitted from the user authenticated to utilize the first service by the authenticating module;
    an other service availability determining module configured to, on the occasion of receiving the utilization request by the first communication device, determine whether the second service is available to the user, based on the information in the available service information database;
    a permission message information updating module configured to, when the other service availability determining module determines that the second service is available, enable the message information based on a permission message in the permission message information database;
    the first communication device configured to, when the other service availability determining module determines that the second service is available, transmit a permission response based on the permission message;
    a second communication device configured to receive a message based on the permission response;
    a service provision propriety determining module configured to verify whether the second service is providable, based on the message received by the second communication device and the message information in the permission message information database; and
    a permission message status releasing device configured to, when the service provision propriety determining module determines that the second service is providable, permit utilization of the second service and disable the message information in the permission message information database.

2. The service verifying system according to claim 1, further comprising:
    an additional information database configured to store additional information for verifying a message further based on additional information used for utilization of the second service,
    wherein the second communication device receives the message further based on the additional information; and
    wherein the service provision propriety determining module determines whether the second service is providable, further based on the additional information in the additional information database.

3. The service verifying system according to claim 1, further comprising:
    an area information database configured to store available area information about an area where the second service is available; and
    an area information updating module configured to, on the occasion of receiving the utilization request by the first communication device, derive the available area information from information about a staying area of a first terminal and store the available area information in the area information database;

wherein the service provision propriety determining module further verifies whether a staying area of a second terminal is within an area where the service is available, based on the available area information in the area information database, and determines that the second service is providable, when a staying area of the second terminal is within an area where the service is available.

4. The service verifying system according to claim 3, wherein when the permission response is enable, based on the message information in the permission message information database, and when the staying area of the first terminal moves away from the available area indicated by the area information database, the area information updating module stores the available area information derived from information about the staying area after the movement of the first terminal, into the area information database.

5. The service verifying system according to claim 3, wherein when the permission response is enable, based on the message information in the permission message information database, when the staying area of the first terminal moves away from the available area indicated by the area information database, and when the first communication device receives the utilization request, the area information updating module stores the available area information derived from information about the staying area after the movement of the first terminal, in the area information database.

6. The service verifying system according to claim 1, further comprising:

a time information database configured to store available time information about a time period in which the second service is available; and a time information updating module configured to, on the occasion of receiving the utilization request by the first communication device, store available time information into the time information database;

wherein the service provision propriety determining module further verifies whether a time when the second communication device receives the message is within the time period in which the service is available, based on the available time information stored in the time information database, and wherein when the time of reception of the message is within the time period in which the second service is available, the service provision propriety determining module determines that the second service is providable.

7. The service verifying system according to claim 1, wherein the first communication device transmits the permission response further based on available area information derived from information about a staying area of a first terminal, and wherein the service provision propriety determining module further verifies whether a staying area of a second terminal is within an area where the service is available, based on the message received by the second communication device, and determines that the second service is providable, when a staying area of the second terminal is within an area where the service is available.

8. The service verifying system according to claim 1, wherein the first communication device transmits the permission response further based on available time information, and wherein the service provision propriety determining module further verifies whether a time when the second communication device receives the message, is within the time period derived from the message received by the second communication device, and wherein when the time of reception of the message is within a time period in which the service is available, based on the message received by the second communication device, the service provision propriety determining module determines that the second service is providable.

9. A service providing method for providing services in a service verification network system, the service verification network system comprising a service verifying system for providing a plurality of services, an authentication requesting terminal authenticated by the service verifying system to utilize a first service provided by the service verifying system, and a service utilizing terminal for utilizing a second service provided by the service verifying system, based on a response transmitted to the authentication requesting terminal for the second service, said service providing method comprising:

a first message transmitting step wherein the authentication requesting terminal transmits a message based on authentication information to the service verifying system, according to an authentication method;

an authenticating step wherein the message received in the first message transmitting step is verified based on authentication information previously stored in the service verifying system, to identify a user of the authentication requesting terminal and authenticate whether the first service is available to the user of the first service;

an other service utilization request transmitting step wherein when the first service is available, the authentication requesting terminal transmits a utilization request for utilization of the second service to the service verifying system;

an other service availability determining step wherein when the utilization request is received in the other service utilization request transmitting step, the service verifying system determines whether the second service is available to the user, based on an information about services available to respective users previously stored in the service verifying system;

a permission message information updating step wherein when it is determined in the other service availability determining step that the second service is available, the service verifying system stores message information based on a permission message to distinguish a permission of utilization of the second service, into permission message information storing module;

a permission response transmitting step wherein when it is determined in the other service availability determining step that the second service is available, the service verifying system transmits a permission response based on the permission message, to the authentication requesting terminal;

a second message transmitting step wherein the service utilizing terminal transmits a message based on the permission response received by the authentication requesting terminal in the permission response transmitting step, to the service verifying system;

a service provision propriety determining step wherein it is verified whether the second service is providable, based on the message received by the second message receiving step and the message information in the permission message information storing module; and a permission message status releasing step wherein when it is determined in the service provision propriety determining step that the second service is providable, utilization of the second service is permitted, and disabling the message information in the permission message information storing module.

10. The service providing method according to claim 9, wherein the second message receiving step receives a message further based on additional information, and
wherein the service provision propriety determining step determines whether the second service is providable, further based on the additional information in the additional information storing module.

11. The service providing method according to claim 9, further comprising an area information updating step of, on the occasion of receiving the utilization request in the other service utilization request transmitting step, deriving available area information from information about a staying area of the authentication requesting terminal and storing the available area information into area information storing module,
wherein the service provision propriety determining step further verifies whether a staying area of the service utilizing terminal is within an area where the service is available, based on the available area information in the area information storing module, and determines that the second service is providable, when a staying area of the service utilizing terminal is within an area where the service is available.

12. The service providing method according to claim 11, wherein when the permission response is enable, based on the message information in the available message information storing module, and when the staying area of the authentication requesting terminal moves off the available area proved by available area information storing module, the area information updating step stores the available area information derived from information about the staying area after the movement of the terminal, in the area information storing module.

13. The service providing method according to claim 11, wherein when the permission response is enable, based on the message information in the available message information storing module, and when the staying area of the authentication requesting terminal moves off the available area proved by available area information storing module, when the authentication requesting terminal transmits the utilization request for utilization of the second service in the other service utilization request transmitting step, the area information updating step stores the available area information derived from information about the staying area after the movement of the terminal, in the area information storing module.

14. The service providing method according to claim 9, further comprising a time information updating step of, on the occasion of receiving the utilization request in the other service utilization request transmitting step, storing available time information about a time period in which the second service is available, into time information storing module,
wherein the service provision propriety determining step further verifies whether a time when the service verifying system receives the message in the second message transmitting step is within the time period in which the service is available, based on the available time information stored in the time information storing module, and wherein when the time of reception of the message is within the time period in which the second service is available, the service provision propriety determining module determines that the second service is providable.

15. The service providing method according to claim 9, wherein the permission response transmitting step transmits the permission response further based on available area information derived from information about a staying area of the authentication requesting terminal, and
wherein the service provision propriety determining step further verifies whether a staying area of the service utilizing terminal is within an area where the service is available, based on the message received by the second message receiving module, and determines that the second service is providable, when a staying area of the service utilizing terminal is within an area where the service is available.

16. The service providing method according to claim 9, wherein the permission response transmitting step transmits the permission response further based on available time information, and
wherein the service provision propriety determining step further verifies whether a time when the service verifying system receives the message in the second message transmitting step is within a time period derived from the message received by the second message receiving module, and wherein when the time of reception of the message is within the time period in which the service is available, based on the message received by the second message receiving module, the service provision propriety determining module determines that the second service is providable.

* * * * *

UNITED STATES PATENT AND TRADEMARK OFFICE
CERTIFICATE OF CORRECTION

PATENT NO. : 7,664,952 B2 Page 1 of 1
APPLICATION NO. : 10/685399
DATED : February 16, 2010
INVENTOR(S) : Eguchi et al.

It is certified that error appears in the above-identified patent and that said Letters Patent is hereby corrected as shown below:

On the title page, Item (75), the Inventors' information is incorrect. Item (75) should read:

Item -- (75) Inventors: Hisatoshi Eguchi, Yokosuka (JP);
Fumiaki Miura, Yokosuka (JP) --

Signed and Sealed this

First Day of June, 2010

David J. Kappos
*Director of the United States Patent and Trademark Office*